United States Patent
Suzuki

(12)
(10) Patent No.: US 6,400,679 B1
(45) Date of Patent: *Jun. 4, 2002

(54) COMMUNICATION RESOURCE ALLOCATION METHOD AND APPARATUS

(75) Inventor: Mitsuhiro Suzuki, Chiba (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/785,792

(22) Filed: Jan. 21, 1997

(30) Foreign Application Priority Data

Jan. 29, 1996 (JP) .............................. 8-012954

(51) Int. Cl.⁷ .................................................. H04J 3/16
(52) U.S. Cl. ...................................... 370/208; 370/343
(58) Field of Search ................................ 370/208, 203, 370/206, 449, 215, 276, 477, 468, 395, 432, 480, 319–321, 324, 333–338, 341–345, 347, 350, 441, 442; 340/825.08; 375/200, 130, 140, 144, 145, 235, 237, 238, 239, 242, 261, 268; 455/500, 501, 502, 519, 516–518, 60

(56) References Cited

U.S. PATENT DOCUMENTS 3,824,597 A * 7/1974 Berg ........................... 370/215
4,521,878 A * 6/1985 Toyanaga .................... 370/203
4,858,225 A   8/1989 deSantis ....................... 370/50
5,479,447 A  12/1995 Chow et al. ................ 375/260
5,541,552 A   7/1996 Suzuki et al. .............. 329/307
5,729,570 A * 3/1998 Magill ........................ 375/260
5,790,514 A * 8/1998 Marchok et al. ............ 375/260
5,978,413 A * 11/1999 Bendes ....................... 375/260

FOREIGN PATENT DOCUMENTS

| EP | 0491668 | 6/1992 | ............ H04J/13/00 |
| WO | 9200639 | 1/1992 | ............ H04L/27/30 |
| WO | 9515626 | 6/1995 | ............ H04J/13/06 |

* cited by examiner

Primary Examiner—Dang Ton
(74) Attorney, Agent, or Firm—Jay H. Maioli

(57) ABSTRACT

A communication resource allocation method and apparatus services, in even the code division multiple access method (CDMA) considered to be suitable for radio transmission using mobile stations such as a cellular phone, a strict orthogonal relationship, so that received signals can be separated from each other completely. This reduces the problem whereby other mobile stations are interfering sources. It also reduces the problem whereby if an application band width for use is defined, the other band widths cannot be applied. The multi-carrier modulation section places a plurality of carriers continuously within a preliminary allocated band and modulates the individual carriers separately. An adder synthesizes a plurality of the carriers modulated by the multi-carrier modulation section. An antenna transmits a synthesized output from the adder.

21 Claims, 15 Drawing Sheets

C : CARRIER
G : GUARD BAND(CARRIER)

C : CARRIER
G : GUARD BAND(CARRIER)

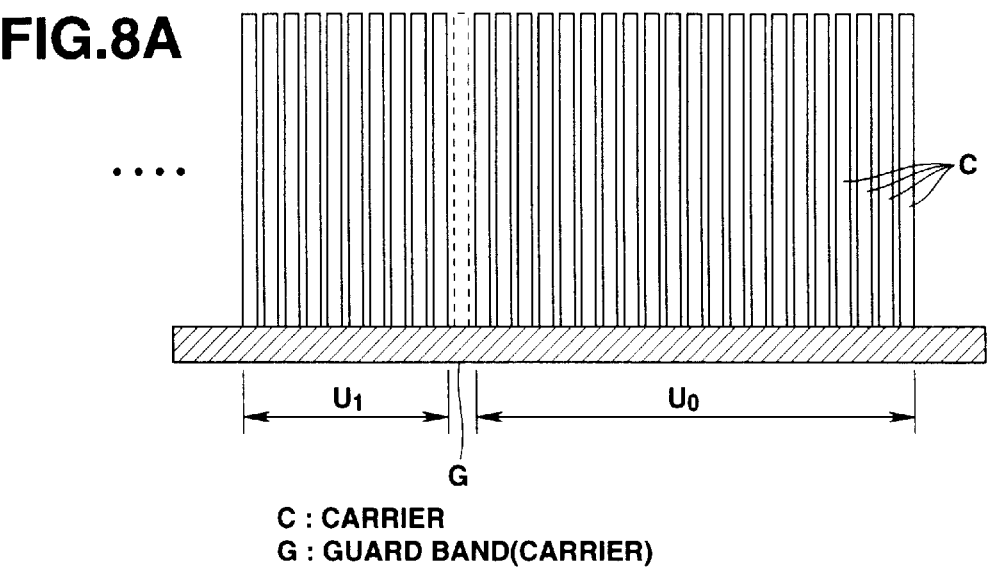
C : CARRIER
G : GUARD BAND(CARRIER)
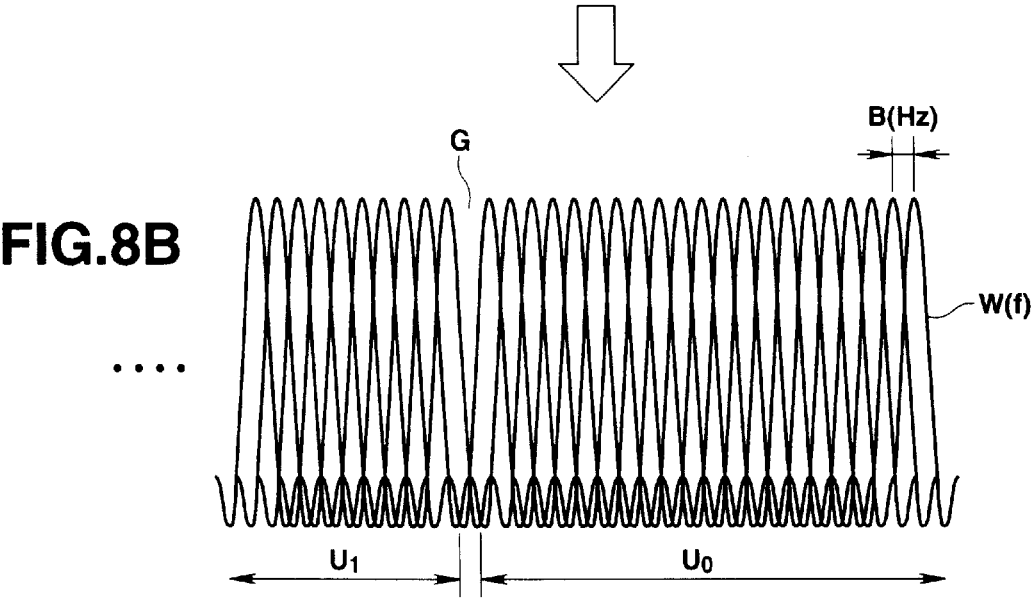

COMMUNICATION RESOURCE ALLOCATION METHOD AND APPARATUS

BACKGROUND OF THE INVENTION

Field of the Invention

This invention relates to a communication resource allocation method and apparatus for allocating signals of plural users in a predetermined band for transmission.

Recently, satellite transmission, mobile transmission or the like uses a communication resource allocation method wherein a plurality of earth station or subscriber station join a single transponder or base station for mutual exchange of information for communication. For example, in communication resource allocation for mobile transmission, a single base station is commonly utilized by a plurality of mobile stations (users). Thus, a variety of methods have been conceived to avoid an interference between respective mobile stations. As methods for this purpose, frequency division multiple access (FDMA), time division multiple access (TDMA) and code division multiple access (CDMA) are currently available.

Of these methods, the CDMA is one communication resource allocation method in which a particular code is allocated to each of mobile stations, a modulated wave by the same carrier is spread in the form of spectrum by this code and transmitted to the same base station and a receiving side encodes respective waves by synchronizing to identify a desired mobile station.

That is, the base station occupies all the band by spread spectrum and transmits to respective mobile stations in the same interval of time and by use of the same frequency band. Then, each mobile station de-spreads signals having a fixed spread band width transmitted from the base station to fetch an appropriate signal. Additionally, the base station identifies respective mobile stations by mutually different codes for spreading.

This CDMA makes it possible to communicate by each direct call if the particular code is determined between the base station and each the respective mobile stations. Additionally, the CDMA is excellent in secrecy in communication and therefore suitable for radio transmission using a mobile station, such as a cellular phone or the like.

By the way, the CDMA makes it difficult to place signals transmitted from different mobile stations in strict orthogonal relationship, so that they cannot be separated from each other completely, thereby other mobile stations being an interfering source. Further, if an application band width is defined, the other band widths cannot be applied.

For example, FIG. 1 illustrates a model for extracting, by de-spreading, a particular user's signal from eight mobile station (user) signals multiplexed by coding. If it is intended to extract, by de-spreading, $U_0$ from eight user signals $U_0$–$U_7$ multiplexed by coding, although user signal $U_0$ can be extracted, the other seven user signals $U_1$–$U_7$ handled by the same base station becomes an interfering source. As a result, as shown in FIG. 1B, noise from the other signals $U_1$–$U_7$ ride on the signal $U_0$, thereby S/N characteristics deteriorating. Thus, radio transmission using the CDMA has a narrow service area because radio wave transmission lowers due to deterioration by interference. Further, because an interference by the other users can be suppressed only by a spreading gain obtained in a process of spectrum de-spreading, the user (mobile stations) capable of connecting to the base station is limited so that the capacity of channel is reduced.

The spreading band width is usually fixed and the number of users which can be multiplexed is limited, therefore the CDMA cannot flexibly cope with respective conditions in frequency allocation different depending on countries. Thus, only a relatively narrow band width can be defined, so that a maximum user rate is also limited.

SUMMARY OF THE INVENTION

To solve the problem described above, it is an object of the present invention to provide a communication resource allocation method and apparatus wherein separation of signals among respective users can be achieved completely so as to prevent deterioration of such characteristics as S/N or the like, the number of users which can be multiplexed can be secured to its maximum extent depending on the band width and transmission rate can be changed.

BRIEF DESCRIPTION OF THE DRAWINGS

FIG. 8 is a diagram for explaining the operation of the present embodiment using the OFDM processing.

FIG. 15 is a diagram showing an example of base station equipment corresponding to a mobile station such as a cellular phone or the like.

FIG. 16 is a diagram showing an example of a computer apparatus accessing an internet or the like through optical fiber or telephone line or the like.

FIG. 17 is a diagram showing an example of a network server to be connected to internet or the like.

DESCRIPTION OF THE PREFERRED EMBODIMENTS

Hereinafter, an embodiment of the communication resource allocation method and apparatus according to the present invention will be described with reference to the accompanying drawings.

Figure 1A:
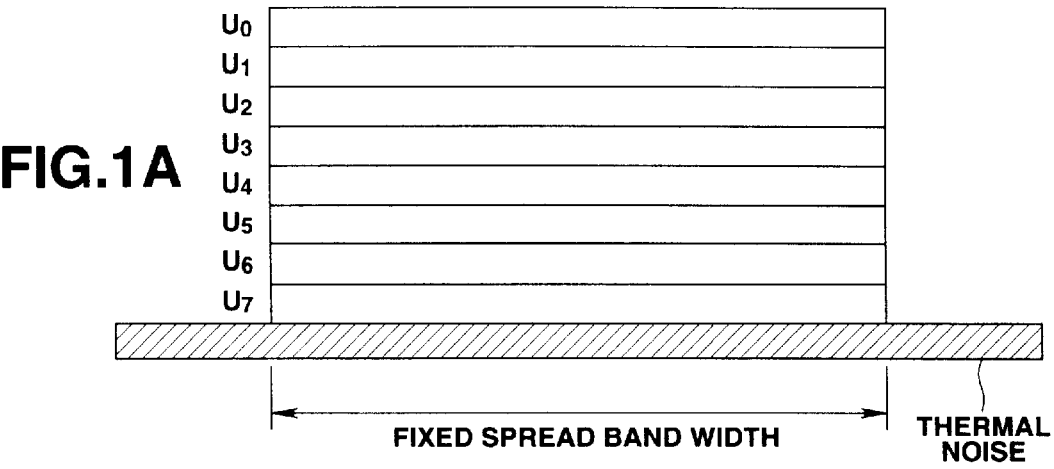
FIGS. 1A, 1B are diagrams showing multiple access by CDMA and the limit of the multiple access.
Figure 1B:
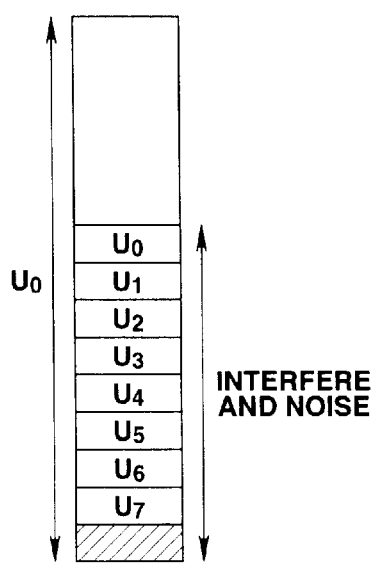
Figure 2:
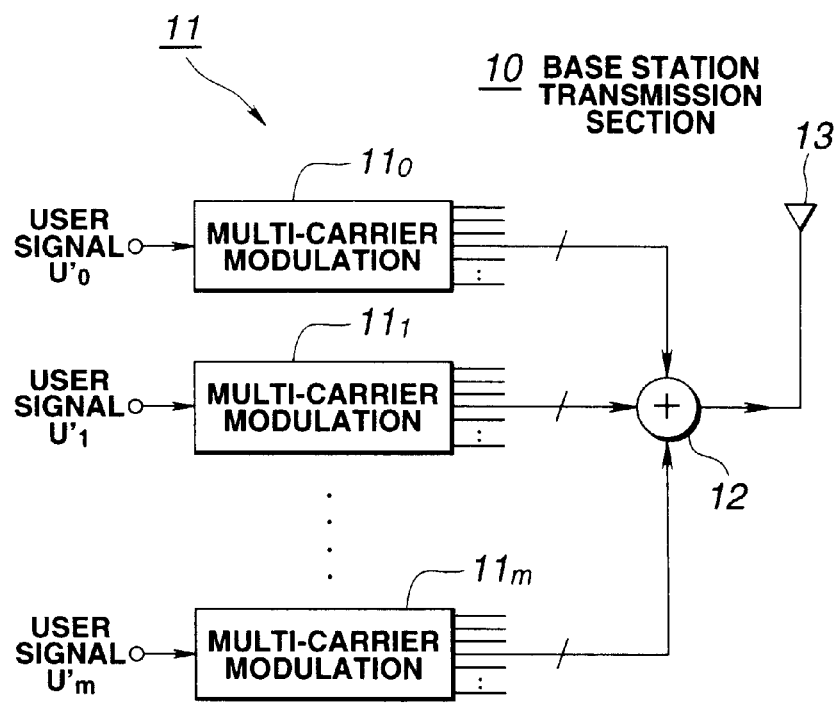
FIG. 2 is a block diagram showing a schematic construction of an embodiment of a communication resource allocation method and apparatus according to the present invention.

According to this embodiment, the communication resource allocation method and apparatus of the present invention is applied to a base station 10, as shown in FIG. 2, which has multiple access to a plurality of user signals for transmission with mobile stations, such as cellular phone or automobile telephone.

This base station 10 includes a multi-carrier modulation section 11 for placing a plurality of carriers continuously within a preliminary allocated band and for dividing and modulating the carriers, and an adder 12 for synthesizing a plurality of the carriers modulated by this multi-carrier modulation section 11. Then, a synthesized output from the adder 12 is transmitted through an antenna 13.

That is, the base station 10 conducts communication resource allocation for multiple access by dividing a plurality of the carriers, placed continuously within a preliminary allocated band having a predetermined width, for respective mobile stations. This communication resource allocation method is called band division multiple access method (BDMA) here.

This BDMA is different from frequency division multiple access (FDMA). The FDMA refers to a communication resource allocation method in which a relatively low transmission rate is determined and a plurality of carriers which are not always sequential are placed on frequency axis. On the other hand, the BDMA refers to a communication resource allocation method in which, as described above, a relatively wide band is initially allocated to a base station and then divided to respective mobile stations under the base station and is different from the above FDMA.

Here, the multi-carrier modulation section 11 contains a plurality of (m+1) multi-carrier modulators $11_0, 11_1, \ldots 11_m$ depending on user signals $U'_0, U'_1, \ldots U'_m$ divided for respective users.

Figure 3:
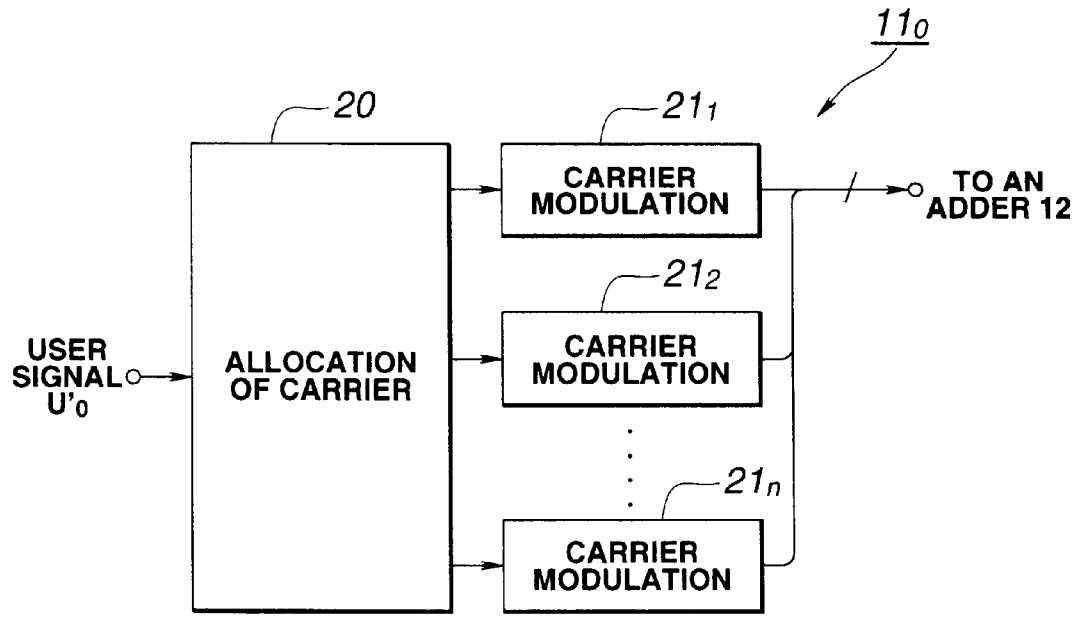
FIG. 3 is a block diagram showing a detailed construction of the major parts of the above embodiment.

The construction of the multi-carrier modulators $11_0, 11_1, \ldots 11_m$ will be described with reference to FIG. 3. FIG. 3 shows, for example, the construction of the multi-carrier modulator $11_0$.

In the multi-carrier modulator $11_0$, carrier allocators 20 allocates a user signal $U'_0$ to a plurality of carriers and the allocated signals are modulated by carrier modulation circuits $21_1, 21_2, \ldots 21_n$. The outputs modulated by the respective carrier modulation circuits $21_1, 21_2, \ldots 21_n$ are supplied to the adder 12.

Figure 4:
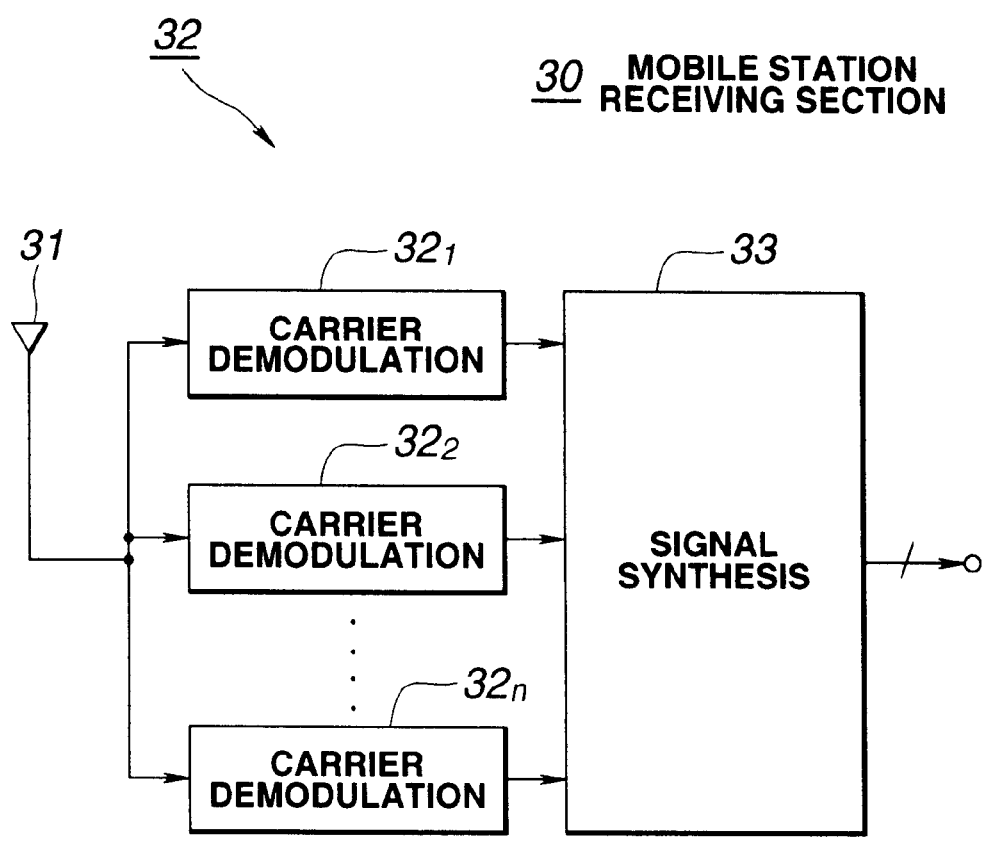
FIG. 4 is a block diagram showing the construction of a mobile station receiving signals transmitted from the above embodiment.

The carrier modulation signals transmitted from an antenna 13 are received by mobile stations 30 which are respective users as shown in FIG. 4. If this mobile station receives, for example, the carrier modulation user signal $U_0$, the respective carrier demodulation circuits $32_1, 32_2, \ldots 32_n$ of the carrier demodulation section 32 demodulate respective carrier modulation signals. Then, the respective demodulation signals are synthesized by a signal synthesizer 33.

Figure 5A:
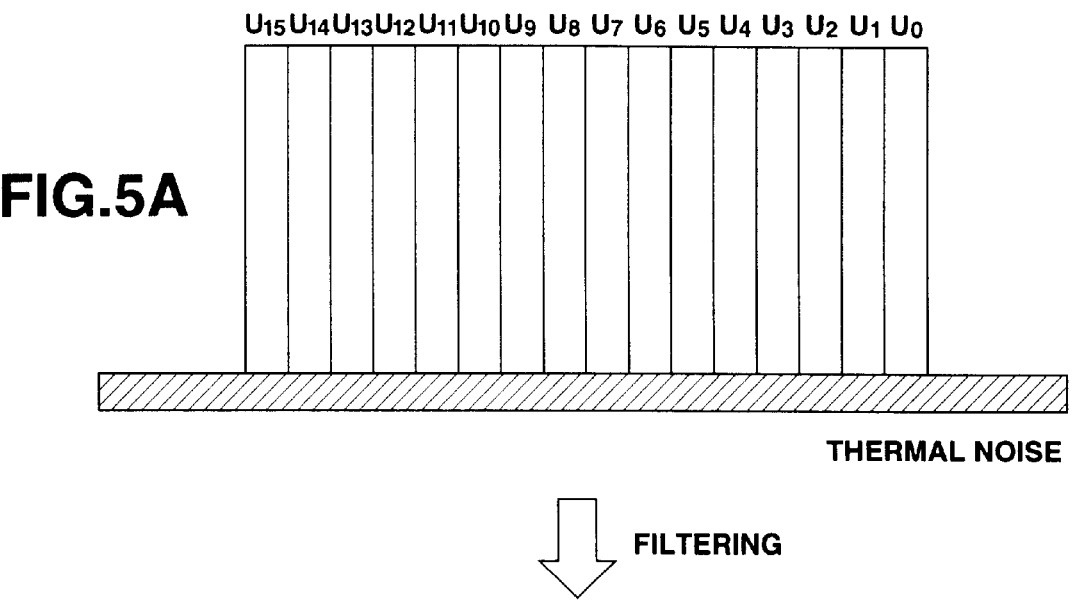
FIGS. 5A, 5B are diagrams showing multiple access conducted by the above embodiment.
Figure 5B:
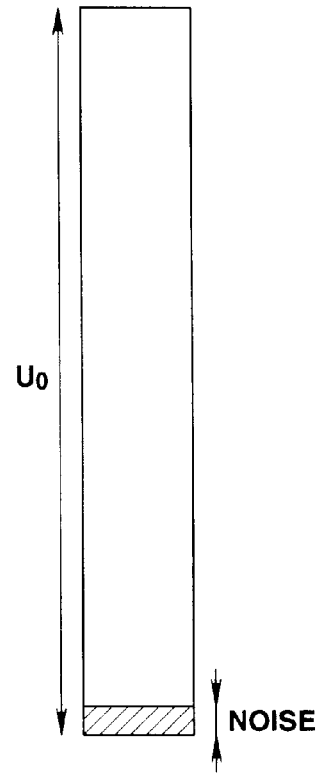

The mobile station 30 fetches the carrier modulation user signal $U_0$ by filtering, by means of a band-pass filter, from a plurality of carrier modulation signals transmitted from the base station by the communication resource allocation method of the BDMA, for example, 16 carrier modulation user signals $U_0, U_1, \ldots U_{15}$ shown in FIG. 5A, in such a manner as shown in FIG. 5B. This is made possible by carrier modulation in which the base station 10 divides a band according to the BDMA. In this case, separation of the respective carrier modulation signals among users can be achieved by the filter completely. That is, the other carrier modulation user signals $U_1, \ldots U_{15}$ handled by the same base station do not become an interference source. Thus, no other carrier modulation user signals rides on a fetched carrier modulation user signal $U_0$, thereby preventing deterioration of S/N ratio.

Further, because there occurs no interference from other users, the base station can determine the number of users which can be multiplexed depending on a predetermined band width.

Figure 6A:
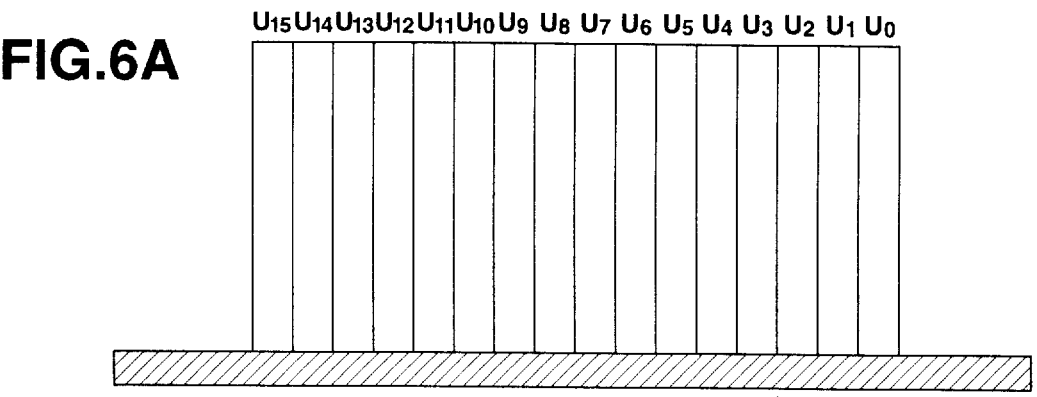
FIG. 6 is a diagram showing a placement of carriers within a band and allocation thereof to user according to the above embodiment.
Figure 6B:
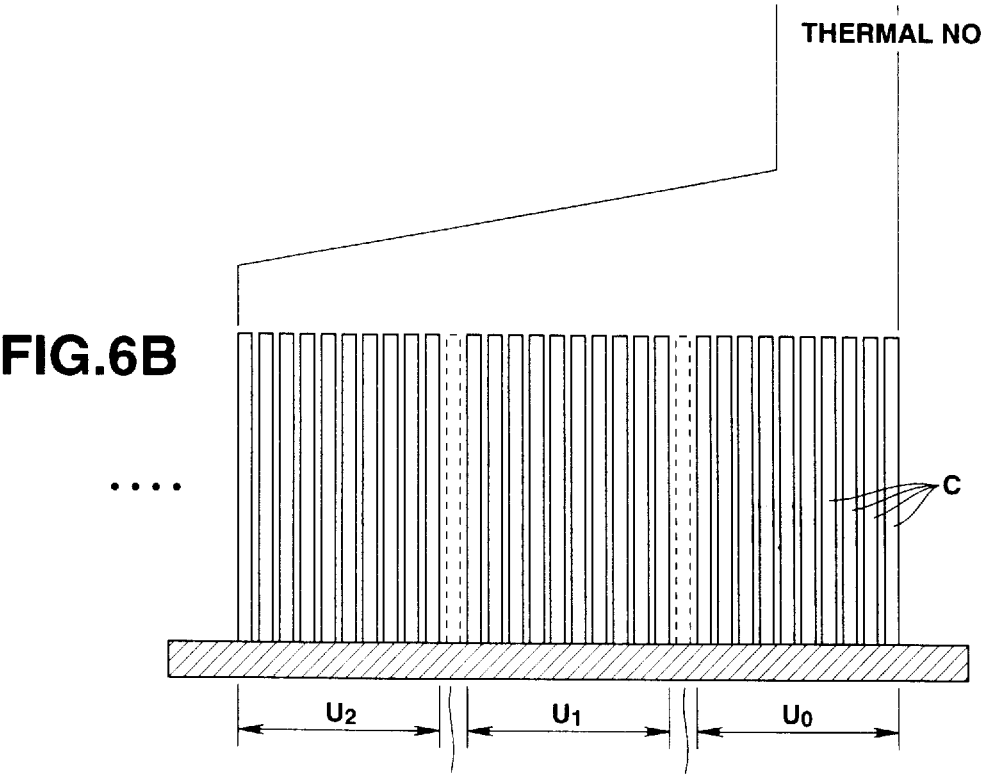

Meanwhile, according to this embodiment, as shown in FIG. 6, narrow band carriers are placed continuously in respective band of each of user signal carriers allocated to the base station 10 by the multi-carrier modulation section 11. Namely, in each of the bands of respective user signals $U_0, U_1, \ldots U_{15}$ shown in FIG. 6A, the multi-carrier modulation section 11 places the carrier C as shown in FIG. 6B.

Here, although the number of the carriers to be allocated to a single user is assumed to be 10, it is permissible that the number is one minimum.

Further, the multi-carrier modulation section 11 places a single carrier having 0 power as a guard band G on the border of each band to minimize an interference of a band in the neighborhood between users placed nearby. Here, if the influence of an interference by the band in the neighborhood is less, it is permissible that the carrier having 0 power does not exist, and if the influence thereof is excessive, a plurality of the carriers having 0 power may be placed.

Figure 7A:
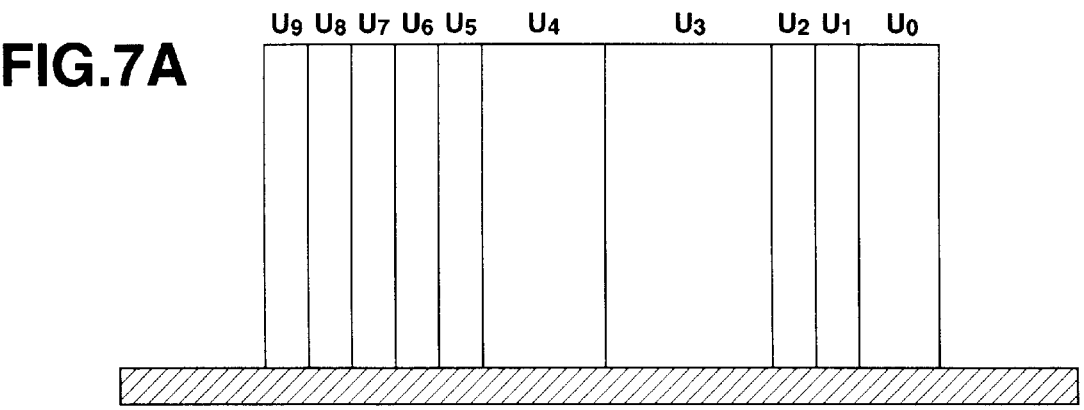
FIG. 7 is a diagram showing variable transmission rates according to the above embodiment.
Figure 7B:
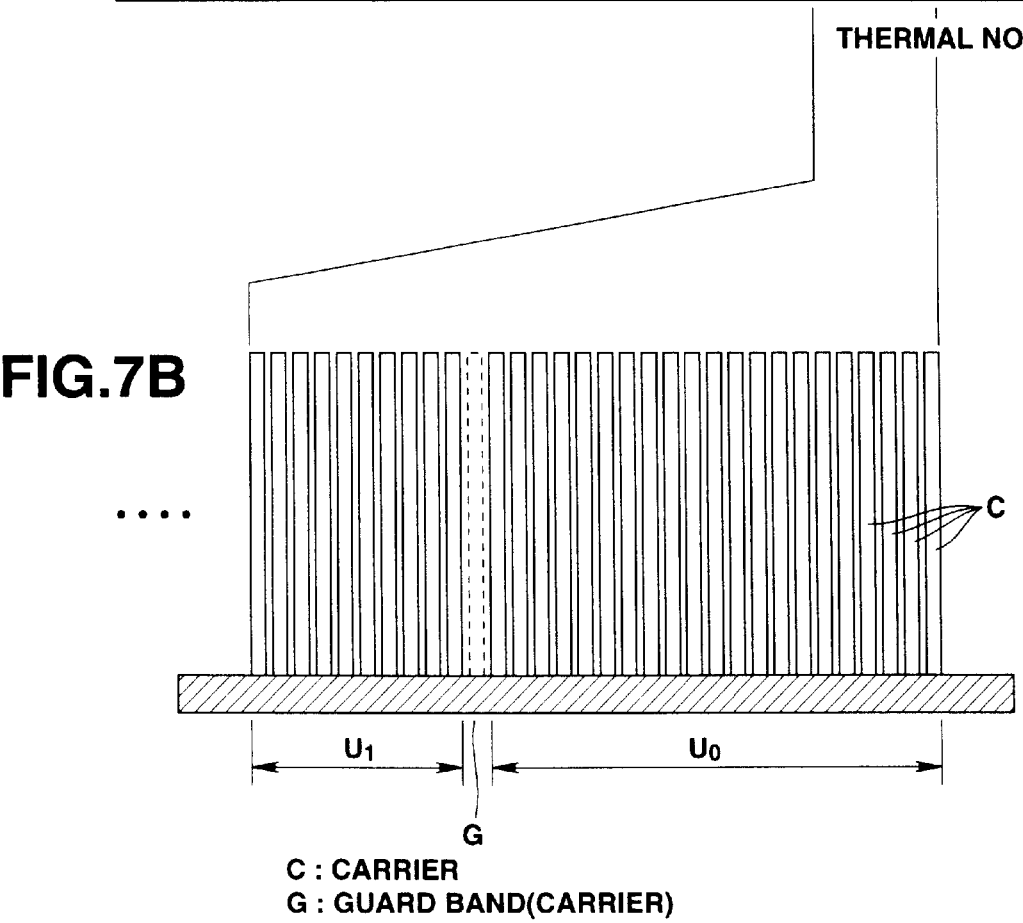

Further, as shown in FIG. 7, the multi-carrier modulation section 11 is capable of the transmission rate by making the number of the carriers C allocated to the users variable. That is, the multi-carrier modulation section 11 is capable of making the division width of a single band variable by dividing the band to an arbitrary number of the carriers C depending on user condition so as to achieve modification of the transmission rate. Division of the carriers C in the carrier modulation user signal U0 and the carrier modulation user signal $U_1$ shown in FIG. 7A can be achieved by mutually different numbers as shown in FIG. 7B. Therefore, the carrier modulation user signal $U_0$ can be transmitted by twice the transmission rate of the carrier modulation user signal $U_1$.

Further, the multi-carrier modulation section 11 may place the plurality of the above carriers continuously as shown in FIG. 8 by orthogonal frequency division multiplex (OFDM) processing. Referring to FIG. 8B, w(f) indicates a waveform indicating an energy on the frequency axis and B indicates a carrier distance.

Here, the OFDM will be described below.

In ordinary modulation, as indicated by the following expression (1), pulse waveforms each represented by h(t) are placed on the time axis, information symbol of xk is posed thereon and the pulse waveforms are slid with respect to each other to be overlapped.

[Expression 1]

$$x(t) = \sum_k x_k h(t - kT) \tag{1}$$

As a result of Fourier transformation of this expression, the expression (2) is obtained as shown below.

[Expression 2]

$$x(f) = \sum_k x_k H(f)\exp(-j2\pi kfT) \quad (2)$$

Then, frequency axis f is replaced by time axis t. Then, f is replaced by t, the symbol time T is replaced by carrier distance B and waveform generation filter H(f) is replaced by time window (t). As a result, the expression (3) can be obtained as shown below.

[Expression 3]

$$x(t) = \sum_k x_k \exp(-j2\pi kBt)(t) \quad (3)$$

This expression (3) presents modulated waves of the unit of an hour under the OFDM.

That is, this expression (3) indicates that modulation symbols of xk are placed on frequency axis, they are modulated by the multi-carrier represented by exp(−j2πkBt), and that time window w(t) limits the modulation because the modulation symbols xk modulated continuously are not located on time axis.

In ordinary multi-carriers, because respective narrow band carrier signals are filtered, the amount of corresponding processing is large and some guard bands are necessary for each of the carriers, so that the efficiency of use of frequency is reduced slightly.

Then, with use of the above OFDM processing, assuming that transmission rate for each of the carriers is B[Hz], the band width necessary therefor can be also B[Hz].

Because, in the OFDM, rapid arithmetic operation using rapid Fourier transformation is possible, this can achieve a far smaller processing than when each of the carriers is processed separately, thereby achieving a more rapid processing.

In a case in which the OFDM is used, the modulation timings of the modulation signals of each carrier need to be synchronous with each other. However, descending channels from the base station to the mobile stations are synchronous with each other for the base station to transmit signals thereto at a time, therefore there being no problem. Although ascending channels from the mobile stations to the base station need to be synchronous between the respective mobile stations, the carriers allocated to the respective mobile stations are sent all at once and can be synchronous, therefore there being no problem. Further, in order to compensate for an individual transmission delay among the respective mobiles stations with respect to the ascending channels, each of the mobile stations conducts time alignment for adjusting transmission time. This enables synchronization of modulation timing among the respective mobile stations, therefore there being no problem.

Figure 9:
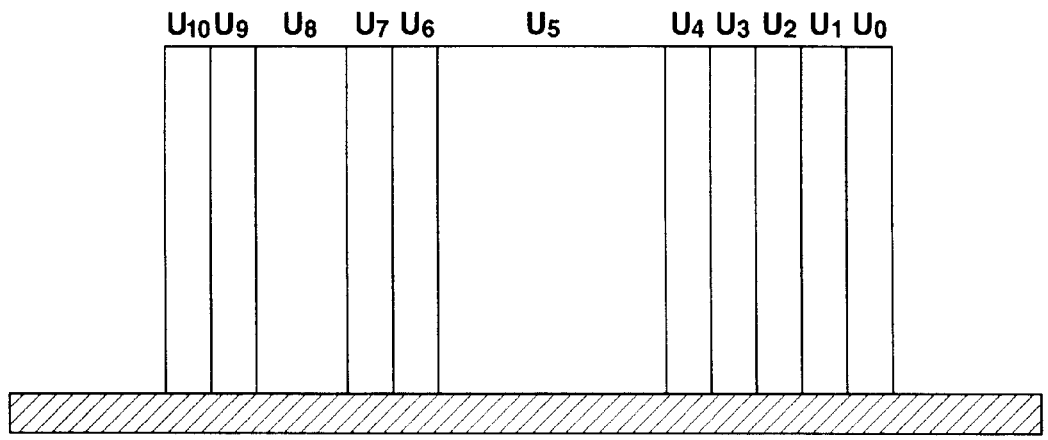
FIG. 9 is a diagram showing a case in which allocation of frequency is wide.
Figure 10:
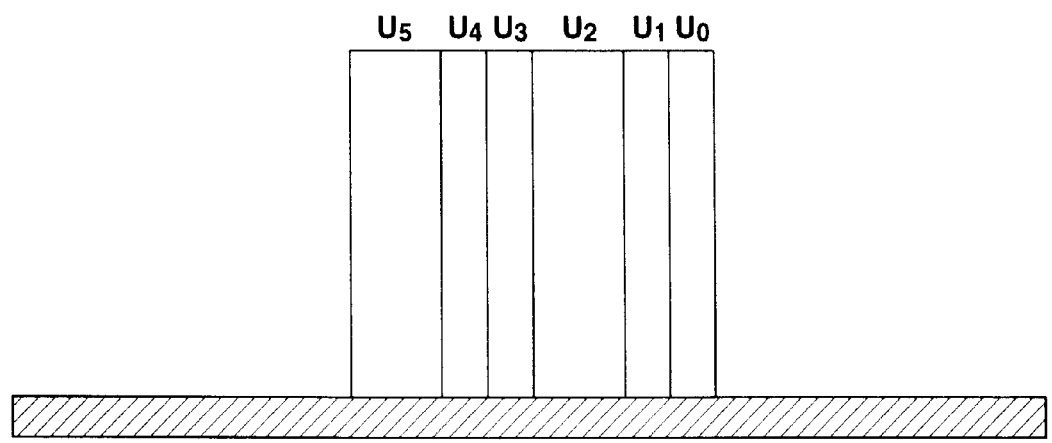
FIG. 10 is a diagram showing a case in which allocation of frequency is narrow.
Figure 11:
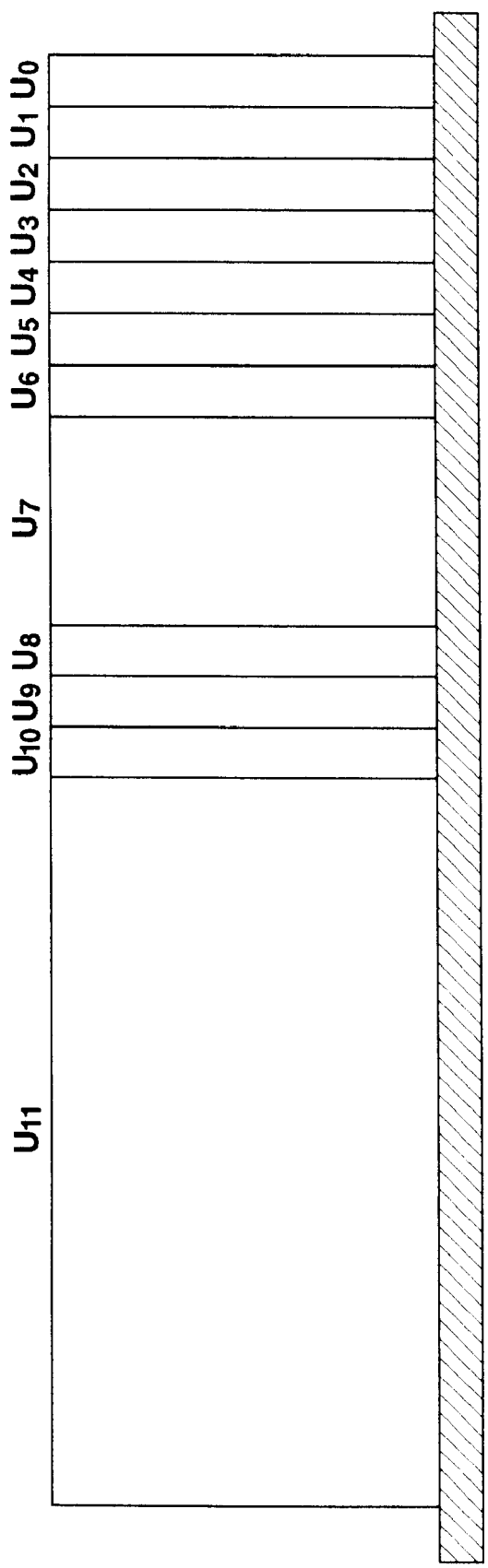
FIG. 11 is a diagram showing a case in which allocation of frequency is particularly wide.

The multi-carrier modulation section 11 may divide the carrier modulation user signals as shown in FIGS. 9–11.

For example, FIG. 9 shows a case of allocation of a relatively wide frequency band. FIG. 10 shows a case of allocation of a relatively narrow frequency band. However, if the frequency band to be allocated is narrow, it can be also operated suitably for that limitation. For example, in a case shown in FIG. 11, the transmission rate to be allocated to a single user can be made especially wide so that there is no limitation with respect to maximum transmission speed for service.

Because the communication resource allocation method and apparatus according to the present invention is capable of separating the carriers between the respective users through a filter, it can suppress an interference from the other users sufficiently, thereby making it possible to prevent deterioration of S/N characteristics. The number of users which can be multiplexed is not limited by an interference from the other users, and can be freely determined depending on the band width to be allocated, obtaining to its maximum extent. By changing the number of the carriers to be allocated to users, it is possible to change the transmission rate or achieve a variable rate. Further, it is possible to arbitrarily set the guard band by placing a carrier having 0 power. If the OFDM is used in multi-carrier modulation, the guard band is not needed between the carriers of different users, thereby making it possible to raise frequency availability. Because rapid Fourier transformation can be utilized, the necessary processing can be small with a rapid processing. Further, system bands allocated to, for example, 5 MHz, 10 MHz, 20 MHz or the like can be operated individually with flexibility. Further, there is no limitation in maximum bit rate which can serve for users and how the maximum bit rate which can serve for users can be changed is determined depending on the band to be allocated. Whatever the system band is, it is possible to realize communication with a narrower band. That is, even if the system band is allocated to 5 MHz or 10 MHz, communication with a narrower band is possible, so that upper compatibility can be realized.

Further, the present invention can be applied to machines and equipment in various fields.

Figure 12:
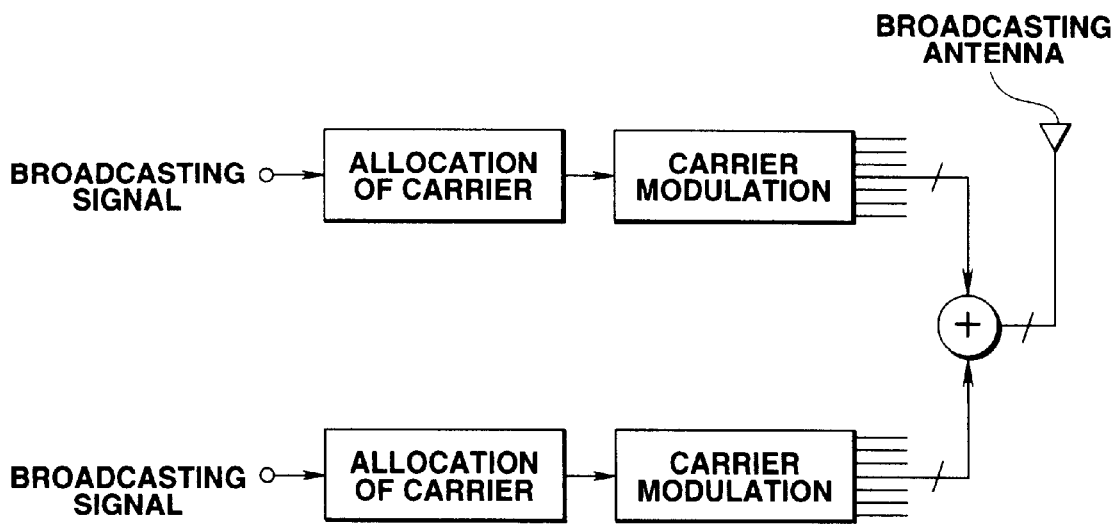
FIG. 12 is a diagram showing a case in which the present invention is applied to broadcasting equipment.
Figure 13:
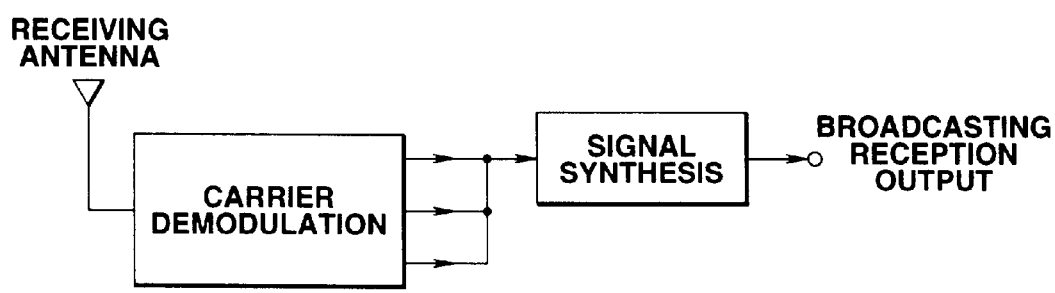
FIG. 13 is a diagram showing a broadcasting receiver.
Figure 14:
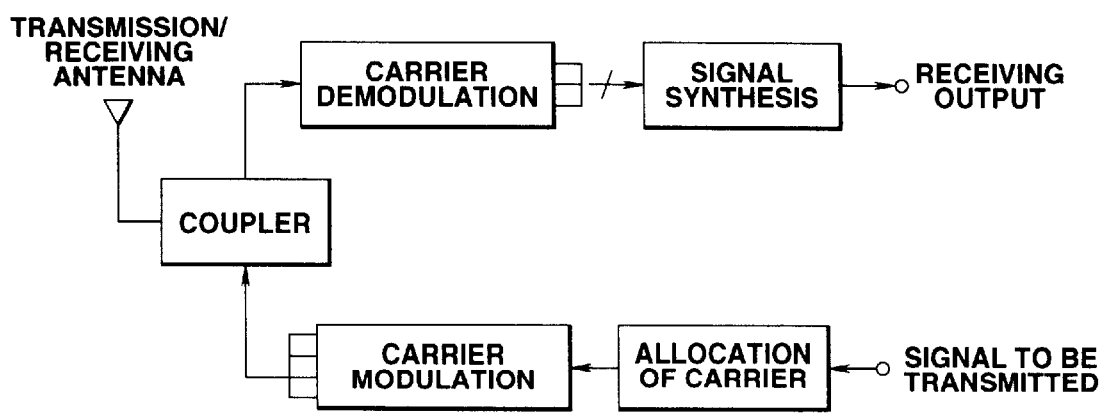
FIG. 14 is a diagram showing a communication terminal apparatus.
Figure 15:
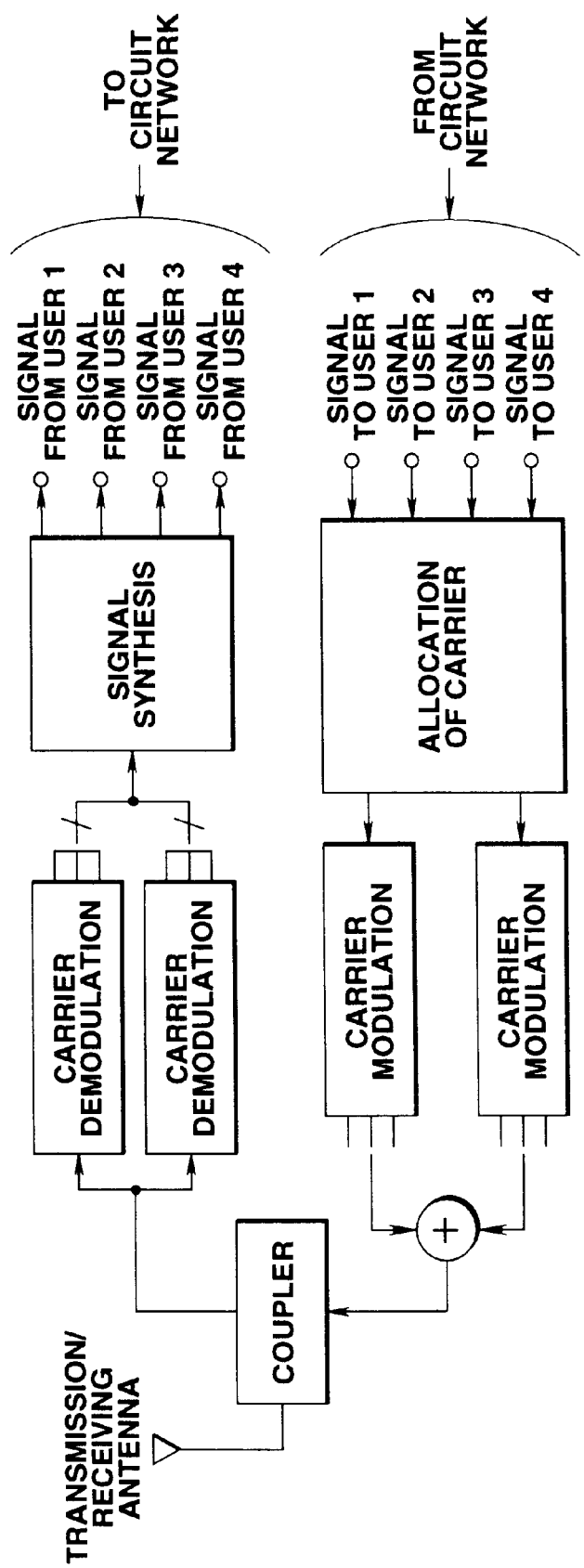
Figure 16:
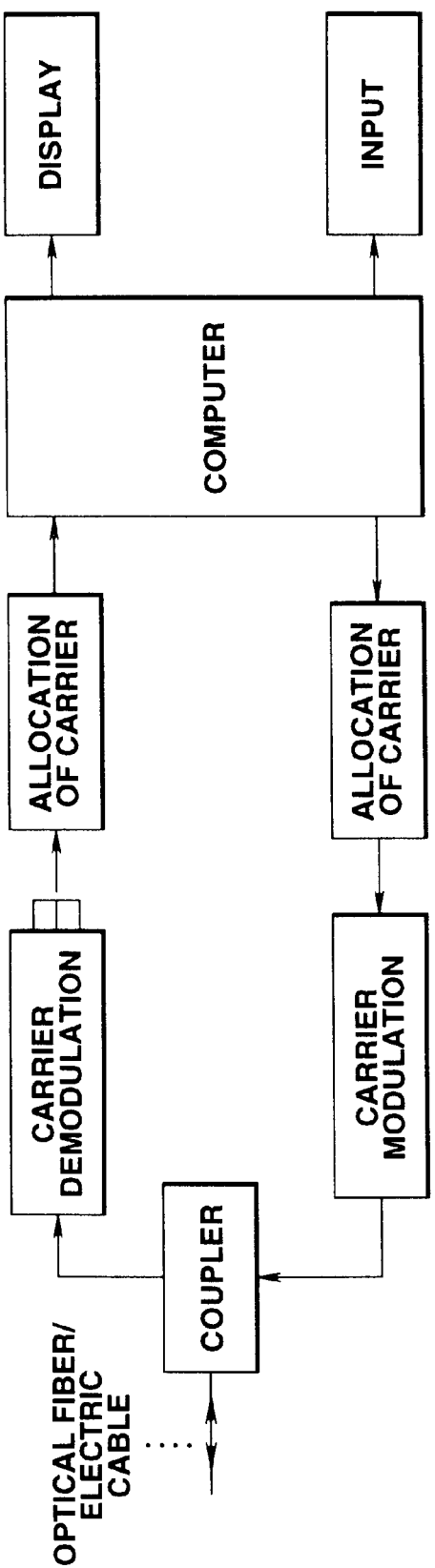
Figure 17:
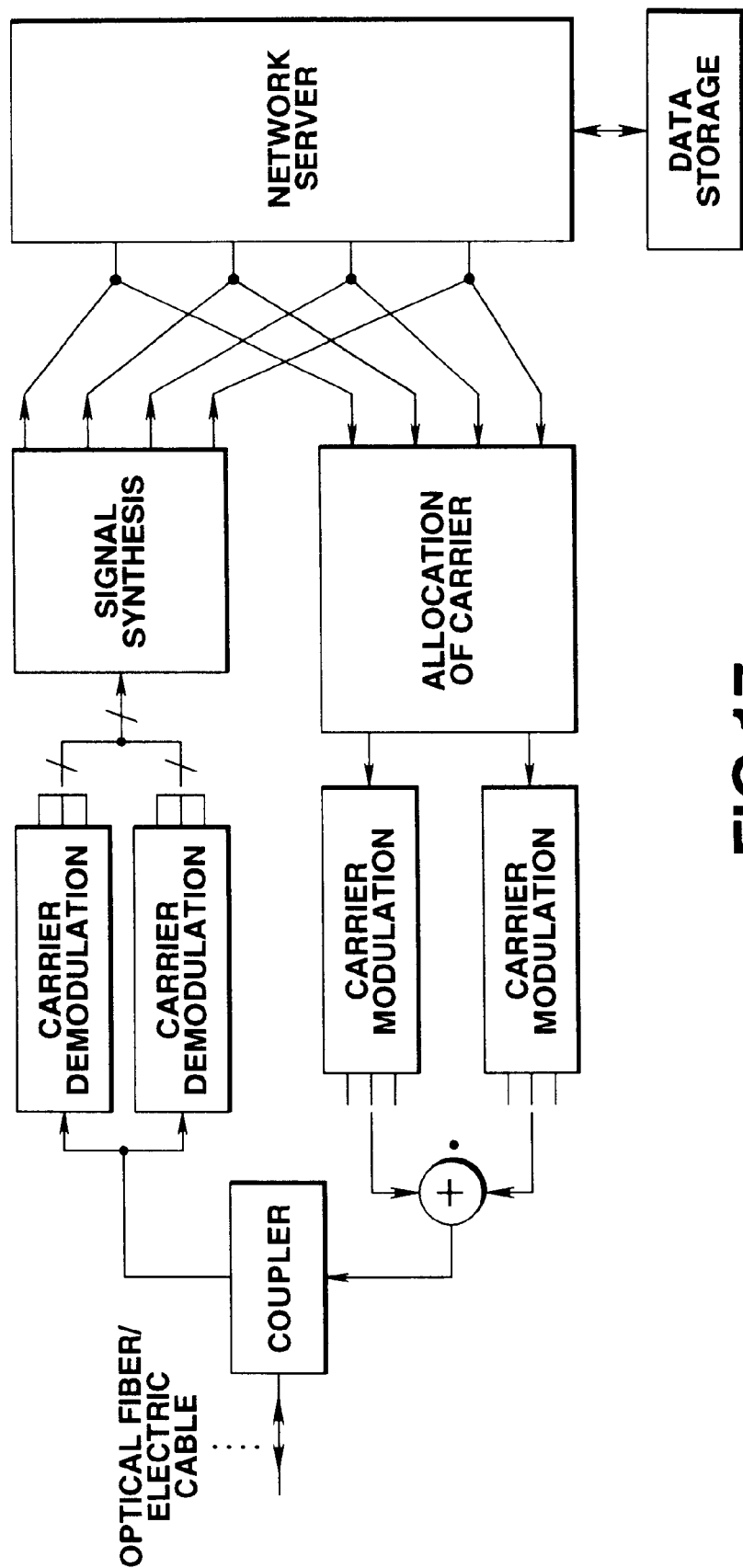
Figure 18:
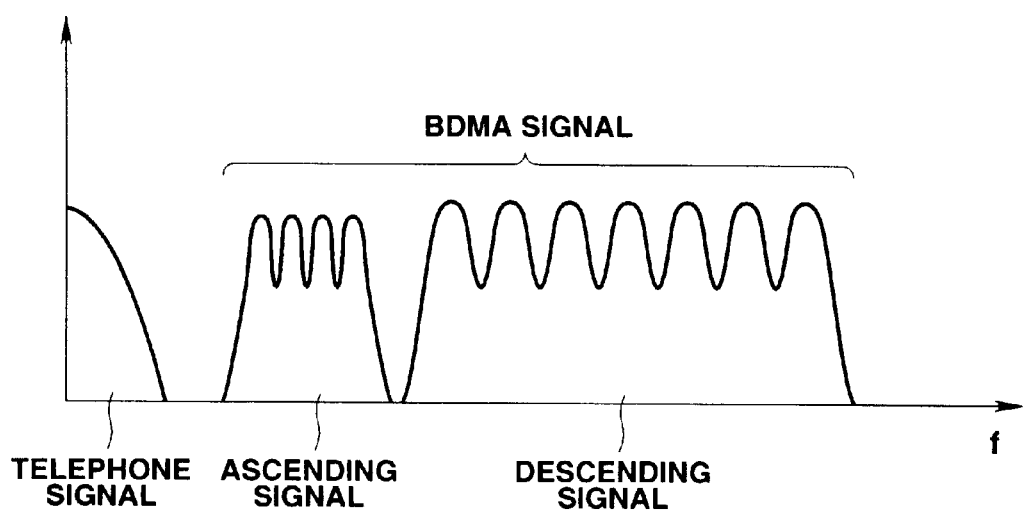
FIG. 18 is a diagram showing an example of application of the present invention to internet.

FIG. 12 is a diagram showing a case in which the present invention is applied to broadcasting equipment. The operation thereof is substantially the same as the above embodiments. FIG. 13 is a diagram showing a broadcasting receiver. This can be applied to TV broadcasting, radio broadcasting or the like and further to ground wave broadcasting and satellite broadcasting. FIG. 14 is a diagram showing a communication terminal apparatus. The present invention can be applied to cellular phones which will be substituted for conventional GSM, PCS, PHS or the like. FIG. 15 is a diagram showing an example of base station equipment corresponding to a mobile station such as a cellular phone or the like. Here, waves transmitted from a plurality of the mobile stations are connected to circuit network. FIG. 16 is a diagram showing an example of a computer apparatus for accessing an internet or the like through optical fiber or telephone line or the like. The present invention can be applied to communications other than radio transmission. FIG. 17 is a diagram showing an example of a network server to be connected to internet or the like. FIG. 18 shows a case of application of the present invention to internet shown in FIGS. 16, 17. As the case of so-called asymmetric digital subscriber line (ADSL), ascending and descending bands can be provided on a conventional telephone band by the BDMA system.

What is claimed is:

1. A communication resource allocation method for allocating user signals for transmission in a communication system having a least a base station, comprising the steps of:

assigning a frequency band to the communication system for use by the base station, wherein said frequency band is simultaneously allocated among a plurality of original user signals, so that the plurality of original user signals continuously occupy the entire assigned frequency band;

allocating simultaneously a plurality of carriers continuously within each original user signal occupying said frequency band;

assigning at least one of the said plurality of the carriers to each original user of the system;

modulating said plurality of carriers in accordance with information to be transferred, so that said carriers are orthogonal to each other.

2. A communication resource allocation apparatus for allocating user signals for transmission in a communication system having a plurality of base stations, comprising:

assigning means for assigning a frequency band to the system for use by one of said plurality of base stations, said frequency band being simultaneously allocated among a plurality of original signals, so that the plurality of original user signals continuously occupy the entire assigned frequency band;

carrier assigning means for simultaneously assigning a portion of said plurality of carriers to each original user of the system, and multi-carrier modulating means for modulating said plurality of carriers in accordance with information to be transferred, so that said plurality of carriers are orthogonal to each other.

3. The communication resource allocation method as claimed in claim 1, wherein each plurality of carriers assigned to each user form a carrier group and contain at least one power reduced carrier located between the carrier group and a next adjacent carrier group.

4. The communication resource allocation apparatus as claimed in claim 2, wherein said portion of said plurality of carriers assigned to each user form a carrier group and each said carrier group contains at least one power reduced carrier located between the carrier group and a next adjacent carrier group.

5. The communication resource allocation method as claimed in claim 1, further comprising the step of:

varying numbers of said plurality of carriers assigned to each user according to an information to be transferred.

6. The communication resource allocation apparatus as claimed in claim 2, wherein numbers of said carriers in said portion of said plurality of carriers assigned to each user are varied in time according to an information to be transferred.

7. A transmitting method of allocating user signals in a communication system having plurality of base stations, comprising the steps of:

assigning a frequency band to the system for use by one of the plurality of base stations, said frequency band being simultaneously allocated among a plurality of original user signals so that the plurality of original user signals continuously occupy the entire frequency band;

allocating a plurality of carriers continuously within each original user signal occupying said frequency band;

simultaneously assigning a portion of said plurality of carriers to each of said plurality of original user signals corresponding to respective original users of the system;

modulating said carriers in accordance with information to be transferred, so that said plurality of carriers are mutually orthogonal;

synthesizing a plurality of said carriers modulated in said modulating step to produce a synthesized output of carrier modulation signals; and transmitting said synthesized output of carrier modulation signals.

8. A transmitting apparatus for allocating user signals in a communication system having a plurality of base stations, comprising:

multi-carrier modulation means for simultaneously allocating a plurality of carriers continuously within each of a plurality of original user signals continuously occupying one of a plurality of predetermined frequency bands respectively assigned for each of said plurality of base stations and for modulating said carriers in accordance with information to be transferred, so that said plurality of carriers are mutually orthogonal, wherein each of said plurality of original user signals contains a portion of said plurality of carriers;

adding means for synthesizing a plurality of said carriers modulated by said multi-carrier modulation means to produce a synthesized output of carrier modulation signals; and transmitting means for transmitting said synthesized output of carrier modulation signals.

9. The transmitting method as claimed in claim 8, wherein each portion of said plurality of carriers assigned to each user signal forms a carrier group and contains at least one power reduced carrier located between the carrier group and a next adjacent carrier group.

10. The transmitting apparatus as claimed in claim 8, wherein each portion of said plurality of carriers assigned to each user signal forms a carrier group and contains at least one power reduced carrier located between the carrier group and a next adjacent carrier group.

11. The transmitting method as claimed in claim 7, further comprising the step of varying numbers of said plurality of carriers assigned to each user signal in time to each user signal according to an information to be transferred.

12. The transmitting apparatus as claimed in claim 8, wherein numbers of said plurality of carriers assigned to each user signal are varied in time according to an information to be transferred.

13. A transmitting and receiving method for transmitting and receiving allocated user signals in a communication system having a plurality of base stations, comprising the steps of:

assigning a respective frequency band to each of said plurality of base stations, wherein each frequency band is occupied by a plurality of sequentially arranged original user signals, so that the plurality of original user signals continuously occupy the entire frequency band;

allocating simultaneously a plurality of carriers continuously within each of said plurality of original user signals;

simultaneously assigning at least one of said carriers to each original user of the system;

modulating said carriers in accordance with information to be transferred, so that said plurality of carriers are mutually orthogonal;

synthesizing a plurality of said carriers modulated by said modulating step to produce a synthesized output of carrier modulation signals;

transmitting said synthesized output of carrier modulation signals;

receiving said synthesized output of carrier modulation signals;

demodulating said synthesized output of carrier modulation signals to produce respective demodulation signals; and synthesizing said respective demodulation signals.

14. A communication subscriber apparatus for use in a communication resource allocation system for allocating user signals in a communication system having a plurality of base stations, comprising:

multi-carrier modulation means for allocation simultaneously a plurality of carriers continuously within each of a plurality of original user signals continuously occupying on eof a plurality of predetermined frequency bands respectively assigned for each of said plurality of base stations and for modulating said carriers in accordance with the information to be transferred, so that said plurality of carriers are mutually orthogonal, and wherein each of said plurality of frequency bands is divided into a plurality of original user signals and each of said plurality of original user signals contains a portion of said plurality of carriers;

adding means for synthesizing a plurality of said carriers modulated by said multi-carrier modulation means to produce a synthesized output of carrier modulation signals;

transmitting means for transmitting said synthesized output of carrier modulation signals;

receiving means for receiving said synthesized output of carrier modulation signals;

demodulating means for demodulating said synthesized output of carrier modulation signals to produce respective demodulation signals; and synthesizing means for synthesizing said respective demodulation signals.

15. A communication base station apparatus, being assigned a predetermined frequency band formed of a plurality of user signals, comprising:

multi-carrier modulation means for allocating a plurality of carriers continuously within each of said plurality of user signals and for modulating said carriers in accordance with information to be transferred, so that each of said plurality of carriers are mutually orthogonal;

adding means for synthesizing a plurality of said carriers modulated by said multi-carrier modulation means and to produce a synthesized output of carrier modulation signals;

transmitting means for transmitting said synthesized output of carrier modulation signals;

receiving means for receiving said synthesized output of carrier modulation signals;

demodulating means for demodulating said synthesized output of carrier modulation signals to produce respective demodulation signals; and synthesizing means for synthesizing respective demodulation signals.

16. The transmitting and receiving method as claimed in claim 13, wherein said plurality of carriers in each user signal form a carrier group and contain at least one power reduced carrier located between the carrier group and a next adjacent carrier group.

17. The communication subscriber apparatus as claimed in claim 14, wherein said plurality of carriers in each user signal form a carrier group and contain at least one power reduced carrier located between the carrier group and a next adjacent carrier group.

18. The communication base station apparatus as claimed in claim 15, wherein said plurality of carriers in each of said plurality of user signals form a carrier group and contain at least one power reduced carrier located between the carrier group and a next adjacent carrier group.

19. The transmitting and receiving method as claimed in claim 13, further comprising the step of:

varying numbers of said plurality of carriers in time in each portion assigned to each user signal according to an information to be transferred.

20. The communication subscriber apparatus as claimed in claim 14, wherein numbers of each portion of said plurality of carriers assigned to each user signal are varied in time according to an information to be transferred.

21. The communication base station apparatus as claimed in claim 15, wherein numbers of said plurality of carriers forming each of said plurality of user signals are varied in time according to an information to be transferred.

* * * * *